(12) United States Patent
Nishihata et al.

(10) Patent No.: US 6,678,081 B2
(45) Date of Patent: Jan. 13, 2004

(54) LIGHT SCANNING SYSTEM

(75) Inventors: Sumihiro Nishihata, Kaisei-machi (JP); Osamu Kuroda, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/253,482

(22) Filed: Sep. 25, 2002

(65) Prior Publication Data

US 2003/0112485 A1 Jun. 19, 2003

(30) Foreign Application Priority Data

Sep. 27, 2001 (JP) ........................................ 2001-295748

(51) Int. Cl.[7] .............................................. G02B 26/08
(52) U.S. Cl. ........................ 359/208; 359/207; 359/216
(58) Field of Search ................................ 359/205–208, 359/216–219; 347/258–261

(56) References Cited

U.S. PATENT DOCUMENTS 5,751,464 A    5/1998   Yoshikawa et al.
5,777,774 A *  7/1998   Iizuka .......................... 359/208
5,801,869 A    9/1998   Yoshikawa et al.

FOREIGN PATENT DOCUMENTS

| JP | 8-211315 | 8/1996 |
| JP | 8-220440 | 8/1996 |
| JP | 11-153764 | 6/1999 |

* cited by examiner

Primary Examiner—James Phan
(74) Attorney, Agent, or Firm—Sughrue Mion, PLLC

(57) ABSTRACT

A light scanning system causes a light spot to scan a surface at a constant speed. The light scanning system includes a light source radiating a light bundle, a deflector which deflects the light bundle, a line image imaging optical system which images the light bundle on a deflecting surface of the deflector as a line image, and a scanning/imaging optical system which images the deflected light bundle on the surface as a light spot. The scanning/imaging optical system consists of a first aspheric mirror which is symmetric with respect to an axis of rotation and is disposed on the light inlet side and a second aspheric mirror which is anamorphic and is disposed on the light outlet side. The first aspheric mirror has a negative power in the light deflecting direction and the second aspheric mirror has a positive power in the light deflecting direction.

3 Claims, 18 Drawing Sheets

LIGHT SCANNING SYSTEM

BACKGROUND OF THE INVENTION

1. Field of the Invention

This invention relates to a light scanning system, and more particularly to a light scanning system in which a deflected light bundle is imaged as a light spot on a surface to be scanned (will be referred to as "a scan surface", hereinbelow) by a catoptric system and the light spot is caused to scan the scan surface.

2. Description of the Related Art

There has been known a light scanning system in which a light bundle is once imaged as a line image on a deflecting surface of a deflecting means (e.g., a rotational polygonal mirror) and the line image of the light bundle is further focused on a scan surface as a light spot and the light spot is caused to scan the scan surface at a constant speed. The performance of an imaging optical system of such a light scanning system is generally evaluated mainly on the fθ characteristic, bow of the scanning line, field curvature and/or the like, and various imaging optical systems have been designed for this purpose. For example, there has been disclosed, in Japanese Unexamined Patent Publication No. 11(2099)-153764, an optical system in which the line image on the deflecting surface is focused on the scan surface by a free curve mirror, and there has been disclosed, in Japanese Unexamined Patent Publication No. 8(1996)-220440, an optical system in which the line image is focused on the scan surface as a light spot by once reflecting the line image by a positive mirror and then reflecting the same by a negative mirror. Further, there has been disclosed, in Japanese Unexamined Patent Publication No. 8(1996)-211315, an optical system in which the line image is focused on the scan surface as a light spot by reflecting the line image by a pair of positive mirrors.

In a light scanning system for use in medical diagnosis, e.g., a laser printer for showing an image for medical diagnosis, there has been a demand that the light spot should scan the scan surface at a constant speed or that an error in fθ characteristic (will be referred to as "an fθ error", hereinbelow) should be as small as possible, in order to suppress distortion of the reproduced image. However, in accordance with the catoptric system designing method based on the conventional (positive and negative) power distribution, it is difficult to design a scanning optical system which is sufficiently small in the fθ error and can cause the light spot to scan the scan surface at a satisfactory constant speed.

SUMMARY OF THE INVENTION

In view of the foregoing observations and description, the primary object of the present invention is to provide a light scanning system which is sufficiently small in fθ error.

In accordance with the present invention, there is provided a light scanning system for causing a light spot to scan a scan surface at a constant speed comprising a light source, a deflecting means which deflects a light bundle radiated from the light source, a line image imaging optical system which is disposed between the light source and the deflecting means and images a light bundle radiated from the light source on a deflecting surface of the deflecting means as a line image extending in a direction in which the light bundle is deflected, and a scanning/imaging optical system which is disposed between the deflecting means and the scan surface and images the light bundle deflected by the deflecting means on the scan surface as a light spot, wherein the improvement comprises that the scanning/imaging optical system comprises a first aspheric mirror which is symmetric with respect to an axis of rotation and is disposed on the light inlet side of the scanning/imaging optical system and a second aspheric mirror which is anamorphic and is disposed on the light outlet side of the scanning/imaging optical system, the first aspheric mirror having a negative power in the direction in which a light bundle impinging upon the first aspheric mirror is deflected and the second aspheric mirror having a positive power in the direction in which a light bundle impinging upon the second aspheric mirror is deflected.

The line image imaging optical system may have a positive power in the direction in which the line image of the light bundle extends.

It is preferred that the scanning/imaging optical system satisfies the following formulae (1) and (2), $$(|\alpha m1 \times efym1| - |\alpha m2 \times efym2|)/efy < 35 \qquad (1)$$

$$d0/efx > 0.4 \qquad (2)$$

wherein $\alpha m1$ represents the inclination to Z-direction of the optical axis of the first aspheric mirror in YZ plane, $efym1$ represents the focal length of the first aspheric mirror, $\alpha m2$ represents the inclination to the Z-direction of the optical axis of the second aspheric mirror in Y-Z plane, $efym2$ represents the focal length of the second aspheric mirror on a cross-section along the Y-Z plane, $efy$ represents the focal length of the scanning/imaging optical system on a cross-section along the Y-Z plane, $efx$ represents the focal length of the scanning/imaging optical system on a plane normal to the Y-Z plane, and $d0$ represents the distance between the deflecting surface of the deflecting means on which the line image is imaged and the front principal point of the scanning/imaging optical system on a plane normal to the Y-Z plane, assuming that a direction in which the light spot is caused to scan the scan surface is the X-direction, a direction which is normal to the X-direction on the scan surface is Y-direction and a direction normal to both the X-direction and the Y-direction (i.e., a direction normal to the scan surface) is the Z-direction.

In the light scanning system of the present invention, since the scanning/imaging optical system comprises a first aspheric mirror which is symmetric with respect to an axis of rotation and is disposed on the light inlet side of the scanning/imaging optical system and a second aspheric mirror which is anamorphic and is disposed on the light outlet side of the scanning/imaging optical system, and the first aspheric mirror has a negative power in the direction in which a light bundle impinging upon the first aspheric mirror is deflected with the second aspheric mirror having a positive power in the direction in which a light bundle impinging upon the second aspheric mirror is deflected, that is, since the catoptric system is designed on the basis of a (positive and negative) power distribution different from that in the conventional catoptric system, a negative distortion is generated. As a result, the fθ error can be smaller as compared with the conventional light scanning system. When the aforesaid formula (2) is satisfied, the fθ error can be further smaller.

When the line image imaging optical system has a positive power in the direction in which the line image of the light bundle extends on the deflecting surface, the field curvature can be smaller.

Further, when the scanning/imaging optical system satisfies the aforesaid formula (1), bow of the scanning line can be suppressed.

DESCRIPTION OF THE PREFERRED EMBODIMENT

Figure 1:
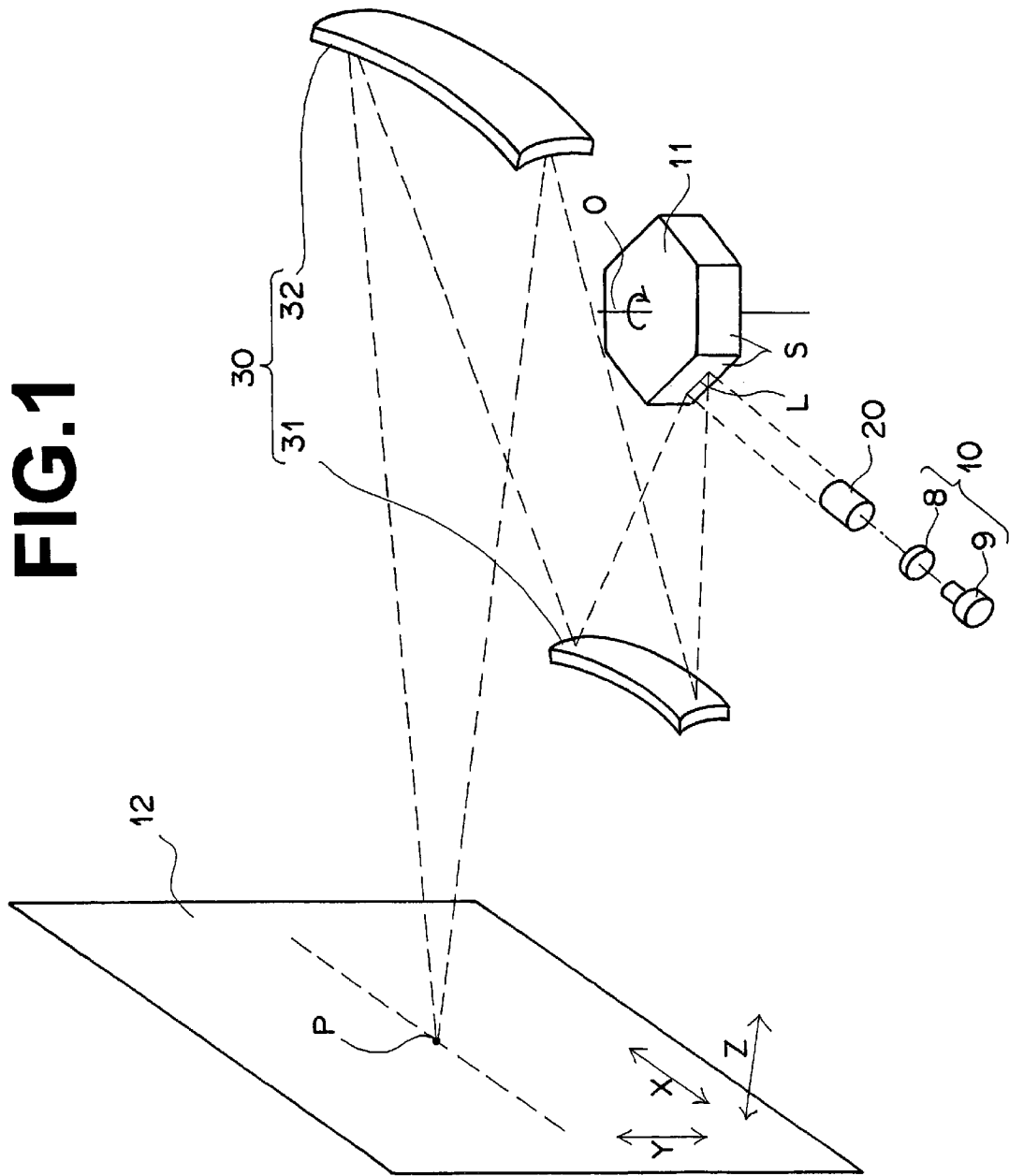
FIG. 1 is a perspective view showing a light scanning system in accordance with an embodiment of the present invention.

In FIG. 1, a light scanning system in accordance with an embodiment of the present invention comprises a light source 10, a rotary polygonal mirror 11 which is rotated by a drive means such as an electric motor (not shown) to deflect a light bundle radiated from the light source 10, a line image imaging optical system 20 which is disposed between the light source 10 and the rotary polygonal mirror 11 which images a light bundle radiated from the light source 10 on a deflecting surface S of the mirror 11 as a line image L extending in a direction in which the light bundle is deflected, and a scanning/imaging optical system 30 which is disposed between the polygonal mirror 11 and a scan surface 12 and images on the scan surface 12 as a light spot P the light bundle deflected by the rotary polygonal mirror 11, and causes the light spot P to scan the scan surface 12 at a constant speed in a direction of arrow X in FIG. 1.

As shown in FIG. 1, the direction normal to the X-direction in which the light spot P is moved on the scan surface 12 is taken as a Y-direction and the direction normal to both the X-direction and the Y-direction (normal to the scan surface 12) is taken as Z-direction.

The light source 10 comprises a semiconductor laser 9 which emits a laser beam and a collimator lens 8 which converts the laser beam emitted from the laser 9 into a parallel beam and a parallel laser beam is radiated from the light source 10.

The line image imaging optical system 20 has a positive power in the Y-direction and images the parallel laser beam radiated from the light source 10 on the deflecting surface S as a line image L. The line image imaging optical system 20 has a positive power also in the direction in which the line image L extends weaker than that in the Y-direction.

The scanning/imaging optical system 30 comprises a first aspheric mirror 31 which is symmetric with respect to an axis of rotation and is disposed on the light inlet side of the scanning/imaging optical system 30 and a second aspheric mirror 32 which is anamorphic and is disposed on the light outlet side of the scanning/imaging optical system 30. The first aspheric mirror 31 has a negative power in the direction in which a light bundle impinging thereupon is deflected and the second aspheric mirror 32 has a positive power in the direction in which a light bundle impinging thereupon is deflected.

The first aspheric mirror 31 reflects a light bundle which is deflected by the rotary polygonal mirror 11 to impinge upon the first aspheric mirror 31 as a light bundle deflected at a larger angle. The second aspheric mirror 32 reflects the light bundle which is reflected by the first aspheric mirror 31 to impinge upon the second aspheric mirror 32 as a light bundle deflected at a smaller angle.

Operation of the light scanning system of this embodiment will be described, hereinbelow.

A parallel light bundle radiated from the light source 10 is imaged on a light deflecting surface S of the rotary polygonal mirror 11 as a line image L by the line image imaging optical system 20 and is further focused on the scan surface 12 as a light spot P by the scanning/imaging optical system 30 comprising the first and second aspheric mirrors 31 and 32. When the parallel light bundle is imaged on the light deflecting surface S as a line image L, the light bundle is slightly converged in the direction in which the line image L extends.

The parallel light bundle is imaged on the scan surface 12 as a light spot P and at the same time, is deflected by the light deflecting surface S of the rotary polygonal mirror 11 to cause the light spot P to repeatedly scan the scan surface 12 in the X-direction through the scanning/imaging optical system 30 comprising the first and second aspheric mirrors 31 and 32 as the rotary polygonal mirror 11 is rotated about an axis of rotation O.

The fθ error of the light scanning system of this embodiment will be discussed, hereinbelow.

Figure 2:
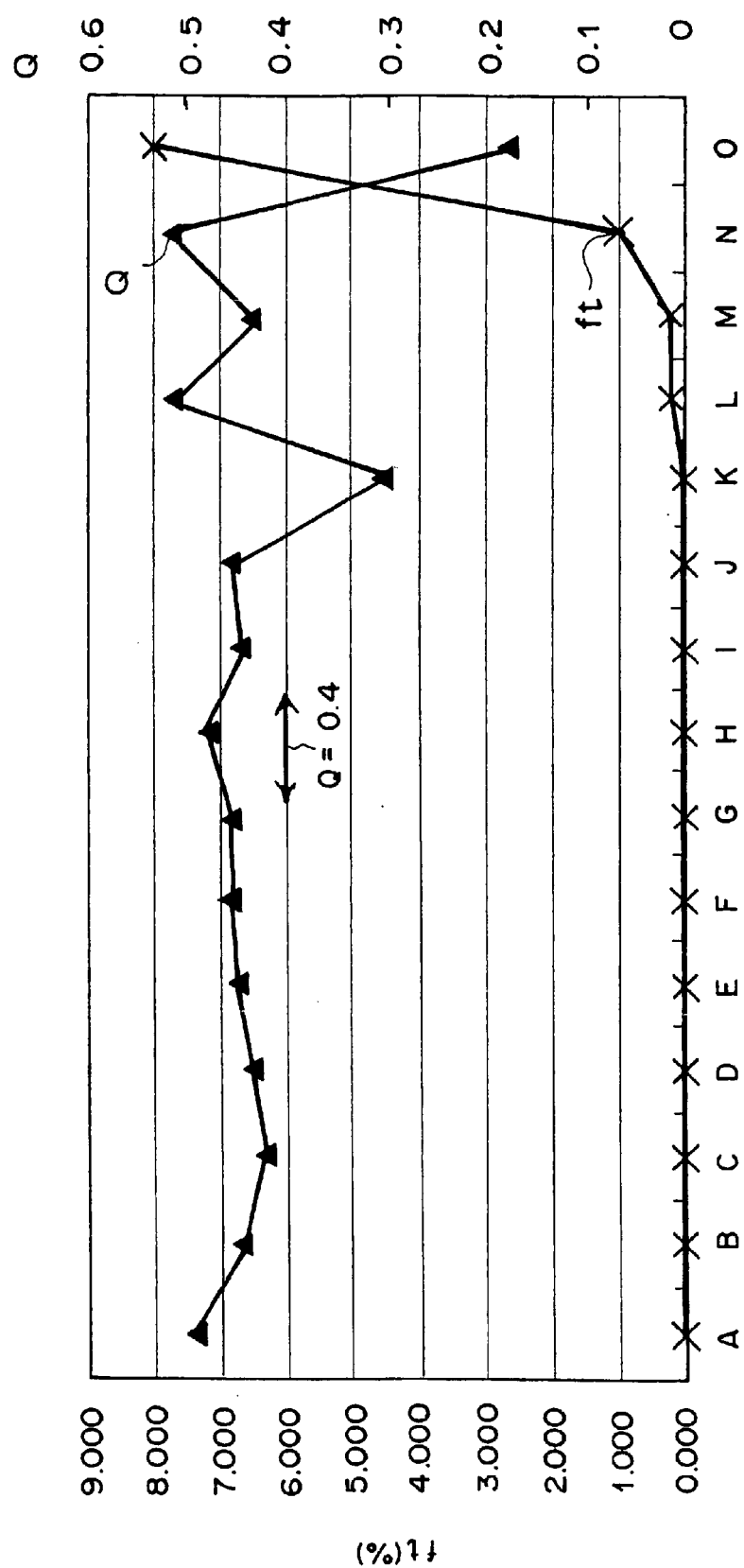
FIG. 2 is a graph showing fθ errors in various examples of designing of the light scanning system shown in FIG. 1.

FIG. 2 is a graph showing fθ errors in fifteen examples of designing (examples of designing A to O) of the light scanning system shown in FIG. 1. In FIG. 2, the left ordinate represents the fluctuation in fθ errors ft, the right ordinate represents the value of Q(=dθ/efx in the aforesaid formula (2)), and the abscissa represents the examples of designing.

The examples of designing A to O are arranged along the abscissa in the order of decreasing fluctuation in fθ errors ft.

The fθ characteristic is a value represented by the following formula.

fθ characteristic={(a distance between a reference scanning position X0 in which the scanning angle is 0 and an actual scanning position—a distance between the reference scanning position X0 and an ideal scanning position)/(a distance between the reference scanning position X0 and the actual scanning position)}×100(%)

The "fluctuation in fθ errors ft" represents a p—p (peak-to-peak) value of values representing fθ characteristics at various evaluation angles, and the "scanning length" means a length by which the light spot is caused to scan the scan surface.

In the following table 1, the examples of designing A to O are arranged in the order of decreasing fluctuation in fθ errors ft.

TABLE 1

| example of designing | ft (%) | Q |
|---|---|---|
| A | 0.000 | 0.495 |
| B | 0.000 | 0.445 |
| C | 0.000 | 0.428 |
| D | 0.000 | 0.446 |
| E | 0.000 | 0.460 |
| F | 0.000 | 0.462 |
| G | 0.001 | 0.461 |
| H | 0.001 | 0.473 |
| I | 0.001 | 0.459 |
| J | 0.003 | 0.461 |
| K | 0.014 | 0.302 |
| L | 0.213 | 0.524 |
| M | 0.225 | 0.432 |
| N | 1.013 | 0.508 |
| O | 8.083 | 0.178 |

As can be seen from FIG. 2 and table 1, the fluctuation in fθ errors ft are substantially not larger than 1% in the examples of designing A to O except the example of designing O and smaller than 0.3% in the examples of designing A to O except the examples of designing N and O. Especially, in the examples of designing A to J, the fluctuation in fθ errors ft are as small as not larger than 0.003%.

The aforesaid formulae (1) and (2) (equal to the following formulae (1) and (2)) will be discussed, hereinbelow.

$$P=(|\alpha m1 \times efym1|-|\alpha m2 \times efym2|)/efy<35 \quad (1)$$

$$Q=d0/efx>0.4 \quad (2)$$

wherein $\alpha m1$ represents the inclination to Z-direction of the optical axis of the first aspheric mirror in YZ plane, $efym1$ represents the focal length of the first aspheric mirror, $\alpha m2$ represents the inclination to the Z-direction of the optical axis of the second aspheric mirror in Y-Z plane, $efym2$ represents the focal length of the second aspheric mirror on a cross-section along the Y-Z plane, $efy$ represents the focal length of the scanning/imaging optical system on a cross-section along the Y-Z plane, $efx$ represents the focal length of the scanning/imaging optical system on a plane normal to the Y-Z plane, and $d0$ represents the distance between the deflecting surface of the deflecting means on which the line image is imaged and the front principal point of the scanning/imaging optical system on a plane normal to the Y-Z plane.

Figure 3:
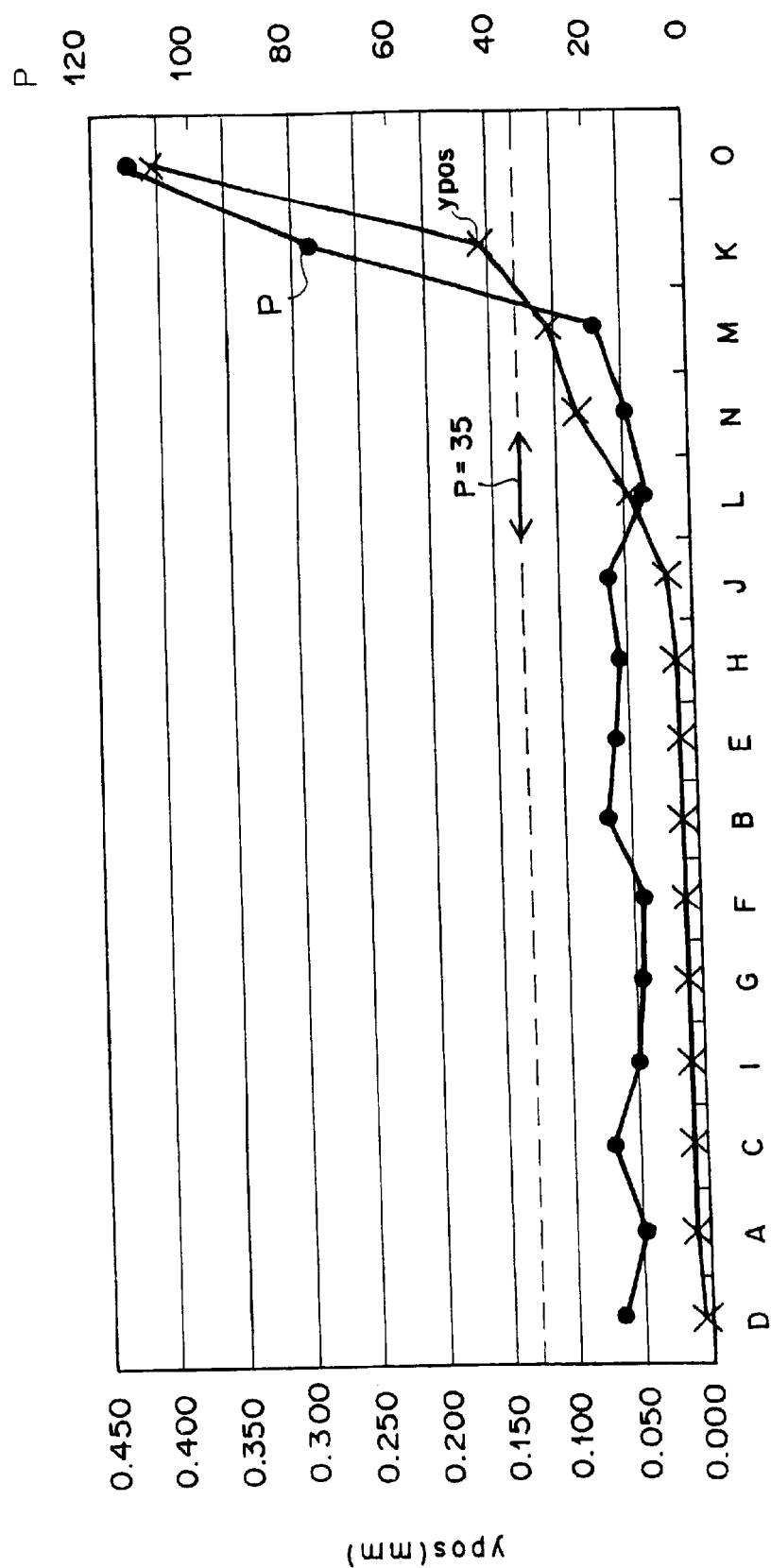
FIG. 3 is a graph showing bows of the scanning line in various examples of designing of the light scanning system shown in FIG. 1.

FIG. 3 is a graph showing the fluctuation in bows of scanning lines in fifteen examples of designing (examples of designing A to O) of the light scanning system shown in FIG. 1. In FIG. 3, the left ordinate represents the fluctuation in bows of the scanning line ypos (a p—p (peak-to-peak) value of the variation of the position of the light spot on the scan surface in the Y-direction) in mm, the right ordinate represents the value of P in the formula (1), and the abscissa represents the examples of designing. The examples of designing A to O are arranged along the abscissa in the order of decreasing fluctuation in bows of the scanning line ypos.

In the following table 2, the examples of designing A to O are arranged in the order of decreasing fluctuation in bows of the scanning line ypos.

TABLE 2

| example of designing | ypos (mm) | P |
|---|---|---|
| D | 0.004 | 17.45151 |
| A | 0.008 | 12.41585 |
| C | 0.008 | 18.71052 |
| I | 0.008 | 12.94674 |
| G | 0.009 | 11.66628 |
| F | 0.009 | 11.17610 |
| B | 0.010 | 17.89876 |
| E | 0.010 | 16.04585 |
| H | 0.012 | 14.70069 |
| J | 0.017 | 16.37963 |
| L | 0.044 | 8.72916 |
| N | 0.083 | 12.12624 |
| M | 0.102 | 18.13760 |
| K | 0.155 | 76.32608 |
| O | 0.408 | 113.64389 |

As can be seen from FIGS. 2 and 3 and tables 1 and 2, the examples of designing which satisfy both the conditions P<35 and Q>0.4 (the examples of designing but K and O) are all very small in bow of scanning line in the Y-direction (ypos is substantially smaller than 0.1 mm). Especially, in eight examples of designing (D, A, C, I, G, F, B and E), the value of ypos is as small as not larger than 0.01, that is, bow of the scanning line in the Y-direction is very small.

The example of designing G (first example of designing), the example of designing H (second example of designing) and the example of designing A (third example of designing) will be described in more detail, hereinbelow.

The aspheric surfaces of the first and second aspheric mirrors are represents as follows.
First Aspheric Mirror $$z=c \times h^2/[1+SQR\{1-(1+K)c^2 \times h^2\}]+Ah^4+Bh^6+Ch^8+Dh^{10}$$

wherein c represents the curvature (c=1/rdy), h represents the height from the optical axis (h=SQR($x^2+y^2$)), K represents the conic constant, and A,B, C and D respectively represent $4^{th}$, $6^{th}$, $8^{th}$ and $10^{th}$ order aspheric coefficients, SQR being a sign representing $\sqrt{\ }$.
Second Aspheric Mirror $$z=(CUX \times x^2+CUY \times y^2)/[1+SQR\{1-$$

$$(1+KX) \times CUX^2 \times x^2-(1+KY) \times CUY^2 \times$$

$$y^2\}]+AR \times \{(1-AP) \times x^2+(1+AP) \times y^2$$

$$\}^2+BR \times \{(1-BP) \times x^2+(1+BP) \times$$

$$y^2\}^3+CR \times \{(1-CP) \times x^2+(1+CP) \times$$

$$y^2\}^4+DR \times \{(1-DP) \times x^2+(1+DP) \times y^2\}^5$$

wherein CUX represents the curvature in the X-Z section (CUX=1/rdx), CUY represents the curvature in the Y-Z section (CUY=1/rdy), KX represents the conic constant in the X-Z section, KY represents the conic constant in the Y-Z section, AR, BR, CR and DR respectively represent the symmetry components of rotation of $4^{th}$, $6^{th}$, $8^{th}$ and $10^{th}$ order deformation coefficients for the respective cones, and AP, BP, CP and DP respectively represent the symmetry components of rotation of $4^{th}$, $6^{th}$, $8^{th}$ and $10^{th}$ order deformation coefficients for the respective cones. It should be noted that a common aspheric surface is obtained when CUX=CUY, KX=KY, AP=BP=CP=DP=0.

<First Example of Designing (Example of Designing G)>

Figure 4:
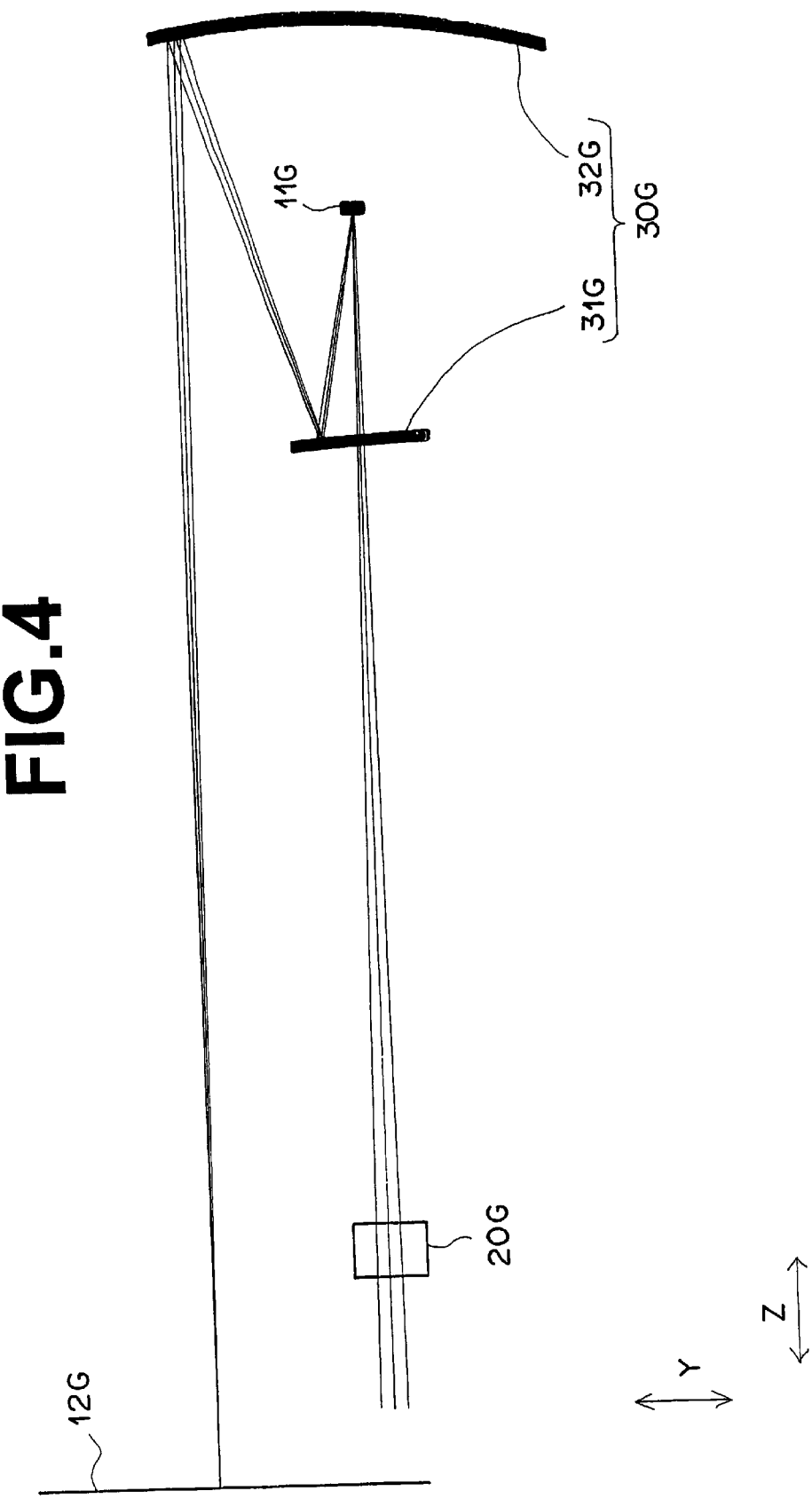
FIG. 4 is a side view briefly showing a first example of designing (example G) of the light scanning system shown in FIG. 1.
Figure 5:
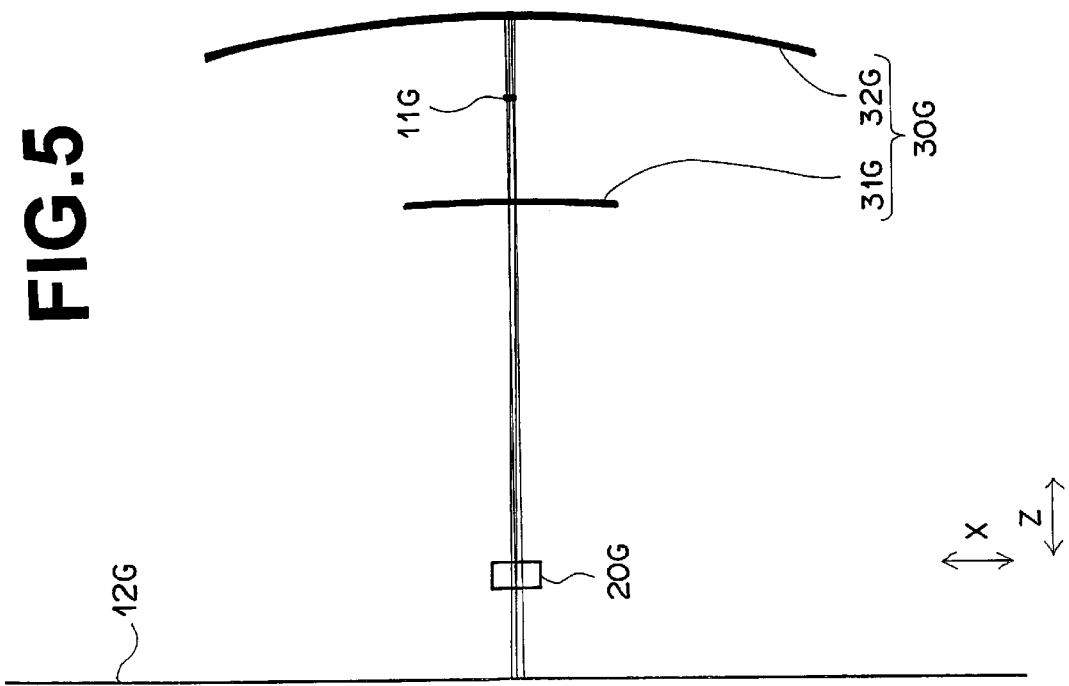
FIG. 5 is a plan view briefly showing the first example of designing of the light scanning system shown in FIG. 1.

FIG. 4 is a side view of the example of designing G and FIG. 5 is a plan view of the same. The optical axis of the line image imaging optical system 20G is moved to the Y-Z plane so that the optical path length from the line image imaging optical system 20G to the rotary polygonal mirror 11G does not change.

The specification of the respective optical elements ((1) to (5)), design performance (6) and calculation of the values of P and Q (7) in the example of designing G will be described hereinbelow.

Fθ characteristics of the light spots imaged on the scan surface at a plurality of rotating angles of the rotary polygonal mirror (i.e., 0°, ±21°, ±29.4° and ±42°), the positions yp of the light spots in the Y-direction at the respective rotating angles of the rotary polygonal mirror, fluctuation in bows of the scanning line ypos, the amount of field curvature xfo in converging the light bundle in the X-direction at the respective rotating angles of the rotary polygonal mirror, fluctuation in amounts of field curvature xfo in converging the light bundle in the X-direction (peak-to-peak value of the amounts of field curvature xfo), the amount of field curvature yfo in converging the light bundle in the Y-direction at the respective rotating angles of the rotary polygonal mirror, fluctuation in amounts of field curvature yfo in converging the light bundle in the Y-direction (peak-to-peak value of the amounts of field curvature yfo) are shown in the following table 3.

TABLE 3

| angle | light spot position | fθ | yp | xfo | yfo |
|---|---|---|---|---|---|
| 42 | 176 | 0 | 2.127 | 0.285 | 0.223 |
| 29.4 | 123.2 | 0 | 2.134 | −0.129 | 0.035 |
| 21 | 88 | 0 | 2.126 | −0.179 | −0.4 |
| 0 | 0 | 0 | 2.129 | 0.1 | 0.1 |
| −21 | −88 | 0 | 2.126 | −0.179 | 0.025 |
| −29.4 | −123.2 | 0 | 2.134 | −0.13 | 0.025 |
| −42 | −176 | 0 | 2.127 | 0.285 | 0.223 |
| p-p | | ft = 0 | ypos = 0.009 | Max:0.465 | Max:0.623 |

Figure 6:
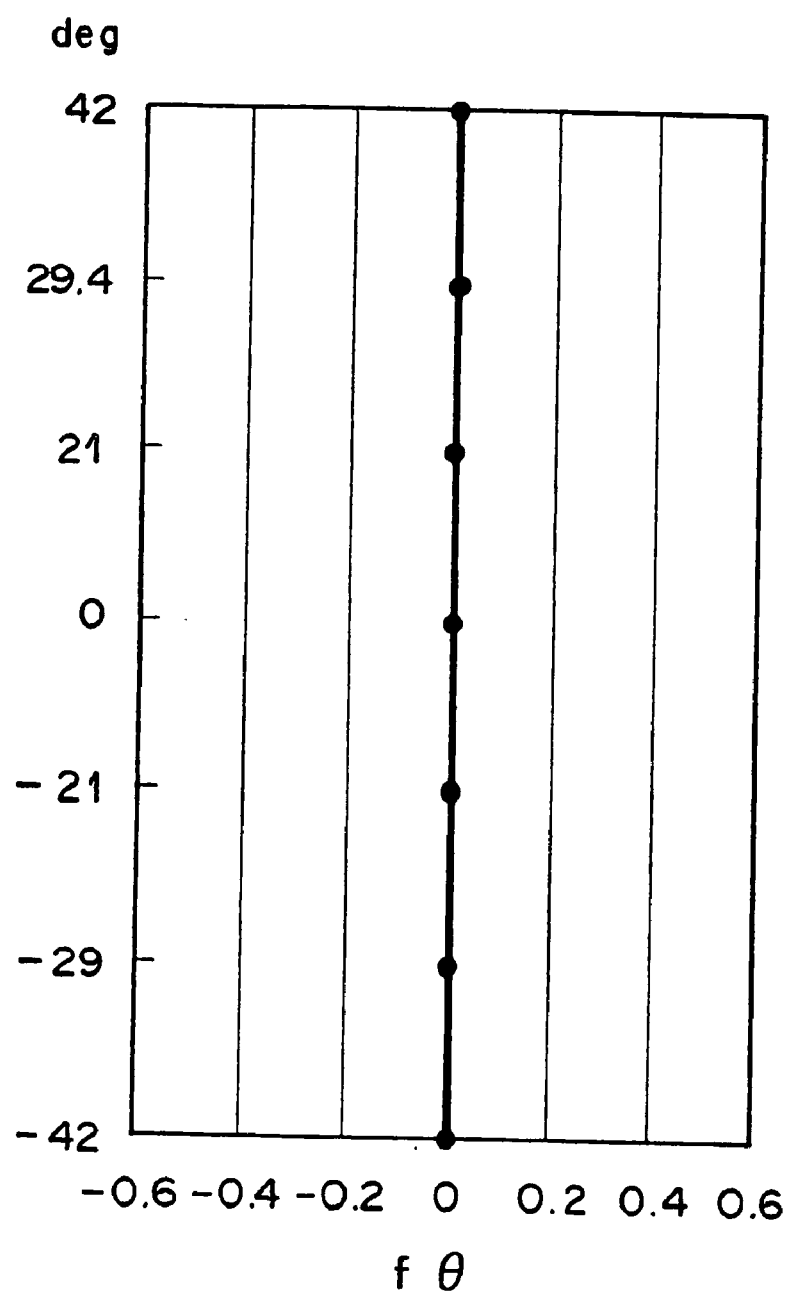
FIG. 6 is a graph showing the width of fθ error in the first example of designing.
Figure 7:
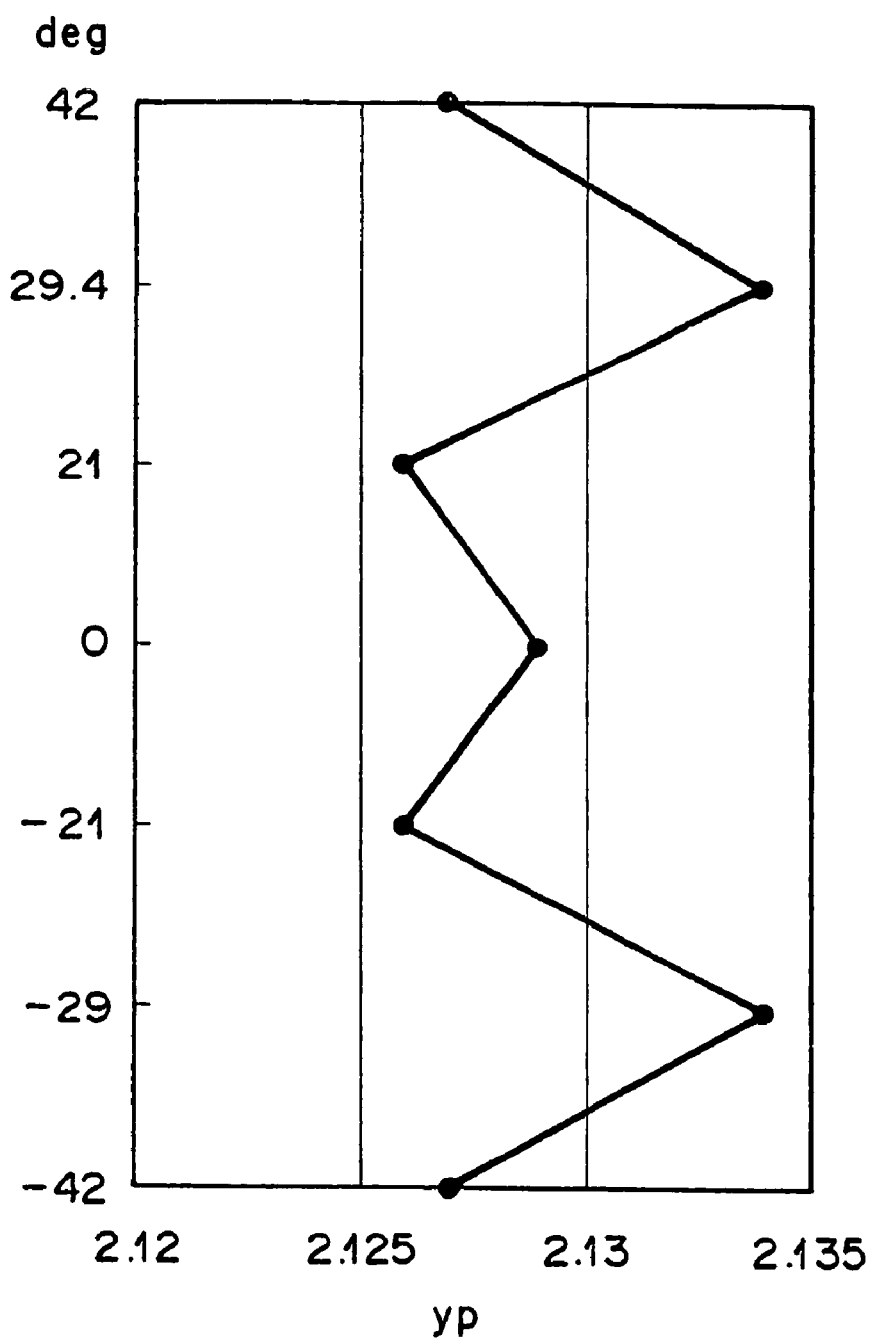
FIG. 7 is a graph showing the bow of the light spot in the Y-direction in the first example of designing.
Figure 8:
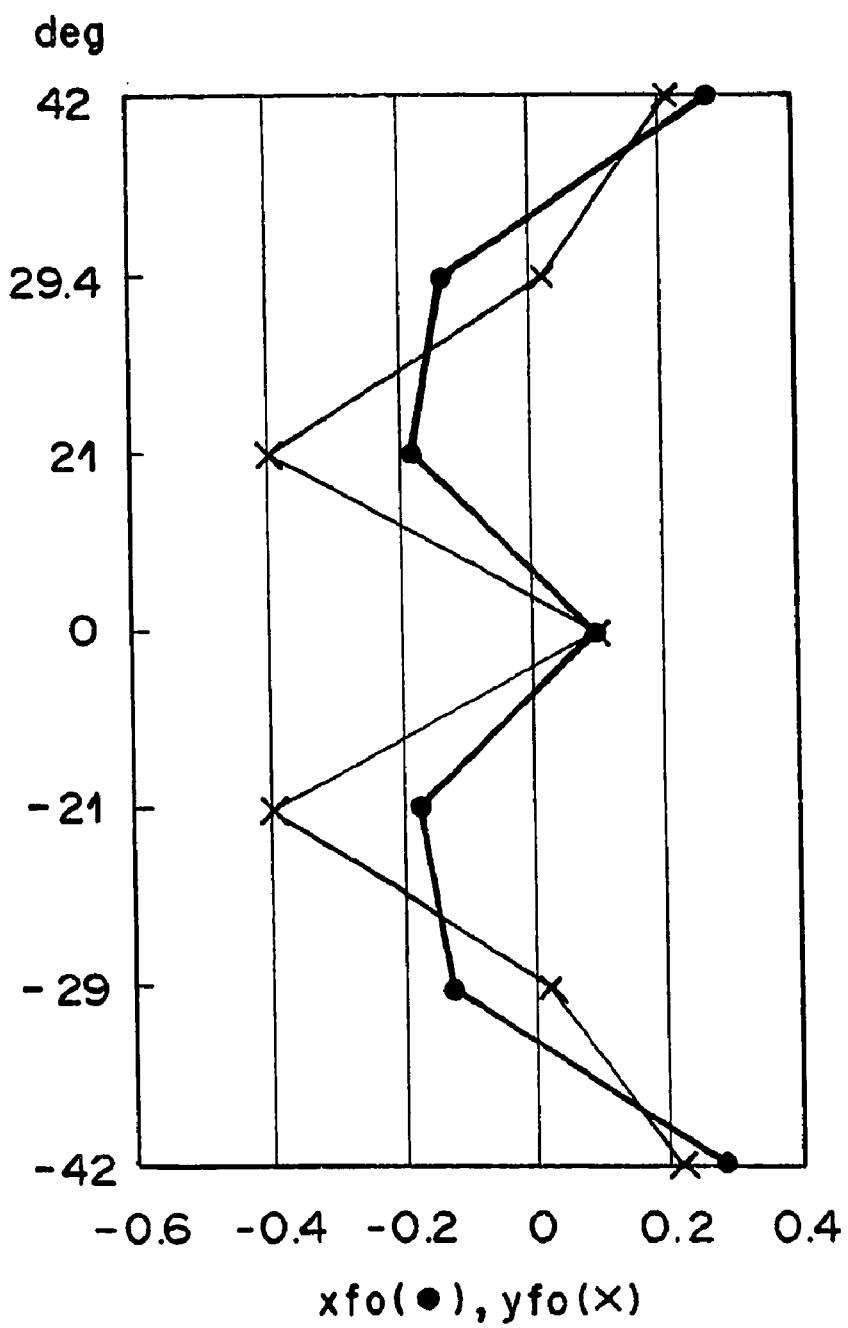
FIG. 8 is a graph showing the field curvature in the first example of designing.

FIGS. 6, 7 and 8 respectively show fθ characteristics of the light spots imaged on the scan surface at the aforesaid rotating angles of the rotary polygonal mirror, the positions yp of the light spots in the Y-direction at the aforesaid rotating angles of the rotary polygonal mirror, and the amount of field curvature xfo in converging the light bundle in the X-direction and the amount of field curvature yfo in converging the light bundle in the Y-direction at the respective rotating angles of the rotary polygonal mirror.

(1) The Specification of the Line Image Imaging Optical System 20G
lens system: single lens
thickness: 8.625837 mm
glass: BSC7 HOYA
radius of curvature of the first face in the Y-Z section, rdy1: 88.73457 mm
radius of curvature of the first face in a cross-section which includes the optical axis and is normal to the Y-Z section, rdx1: 310.2599 mm
radius of curvature of the second face in the Y-Z section, rdy2=radius of curvature of the second face in a cross-section which includes the optical axis and is normal to the Y-Z section, rdx2=∞ (plane)

(2) The Specification of the First Aspheric Mirror 31G
focal length in the Y-Z section, efym1=focal length in a cross-section which includes the optical axis and is normal to the Y-Z section, efxm1=−272.354 mm
rdy=554.70842 mm
aspheric coefficients
 K=−51.928874
 A=0.7630001E−7
 B=−0.197933E−10
 C=−0.145888E−13
 D=0.725540E−17
inclination to the Z-direction of the aspheric axis in the YZ section, αm1: 3.437°

(3) The Specification of the Second Aspheric Mirror 32G
focal length in the Y-Z section, efym2=66.187 mm
focal length in a cross-section which includes the optical axis and is normal to the Y-Z section, efxm2=185.074 mm
rdy=−132.37387 mm
rdx=−370.14752 mm
aspheric parameters
 KY=−2.005179
 KX=−1.494253
 AR=−0.550051E−08
 BR=0.728624E−12
 CR=−0.279367E−14
 DR=0.56269E−18
 AP=−0.411218E−01
 BP=0.330127E+00
 CP=0.858727E+00
 DP=0.898273E+00
inclination to the Z-direction of the aspheric axis in the YZ section, αm2: −2.455°

(4) The Specification of the Scanning/Imaging Optical System 30G (The Combined Specification of the First and Second Aspheric Mirrors 31G and 32G)
focal length in the Y-Z section, efy=66.305 mm
focal length in a cross-section which includes the optical axis and is normal to the Y-Z section, efx=329.484 mm
distance between the reflecting surface in a plane which includes the optical axis and is normal to the Y-Z section and the front principal point of the scanning/imaging optical system, H: 116.971 mm (5) Other Data
the distance from the rear end of the line image imaging optical system 20G to the deflecting face of the rotary polygonal mirror 11G: 166.555 mm
distance from the deflecting face of the rotary polygonal mirror 11G to the first aspheric mirror 31G, $d_{pmm1}$: 35.000 mm
distance from the first aspheric mirror 31G to the second aspheric mirror 32G, $d_{m1m2}$: 65.704 mm
distance from the second aspheric mirror 32G to the scan surface 12G: 237.899 mm
inclination to the Y-direction of the axis of rotation of the rotary polygonal mirror 11G in the YZ section: 5.0°
length of the first aspheric mirror 31G in the X-direction (corresponding to the whole scanning angle): 70 mm length of the second aspheric mirror 32G in the X-direction (corresponding to the whole scanning angle): 200 mm
(6) Design Performance
fluctuation in bows of scanning lines (p—p): 0.009 mm
fluctuation in fθ errors (%): 0.000(%)
fluctuation in amounts of field curvature in converging the light bundle in the Y-direction (p—p): 0.465 mm
fluctuation in amounts of field curvature in converging the light bundle in the X-direction (p—p): 0.623 mm
(7) Calculation of the Values of P and Q $$P = (|\alpha m1 \times efym1| - |\alpha m2 \times efym2|)/efy$$
$$= (|3.437 \times (-272.354)| - |(-2.455) \times 66.187|)/66.305$$
$$= 11.667 < 35$$

$$Q = d0/efx$$
$$= (d_{pmn1} + H)/efx$$
$$= (35.000 + 116.971)/329.484$$
$$= 0.461 > 0.4$$

<Second Example of Designing (Example of Designing H)>

Figure 9:
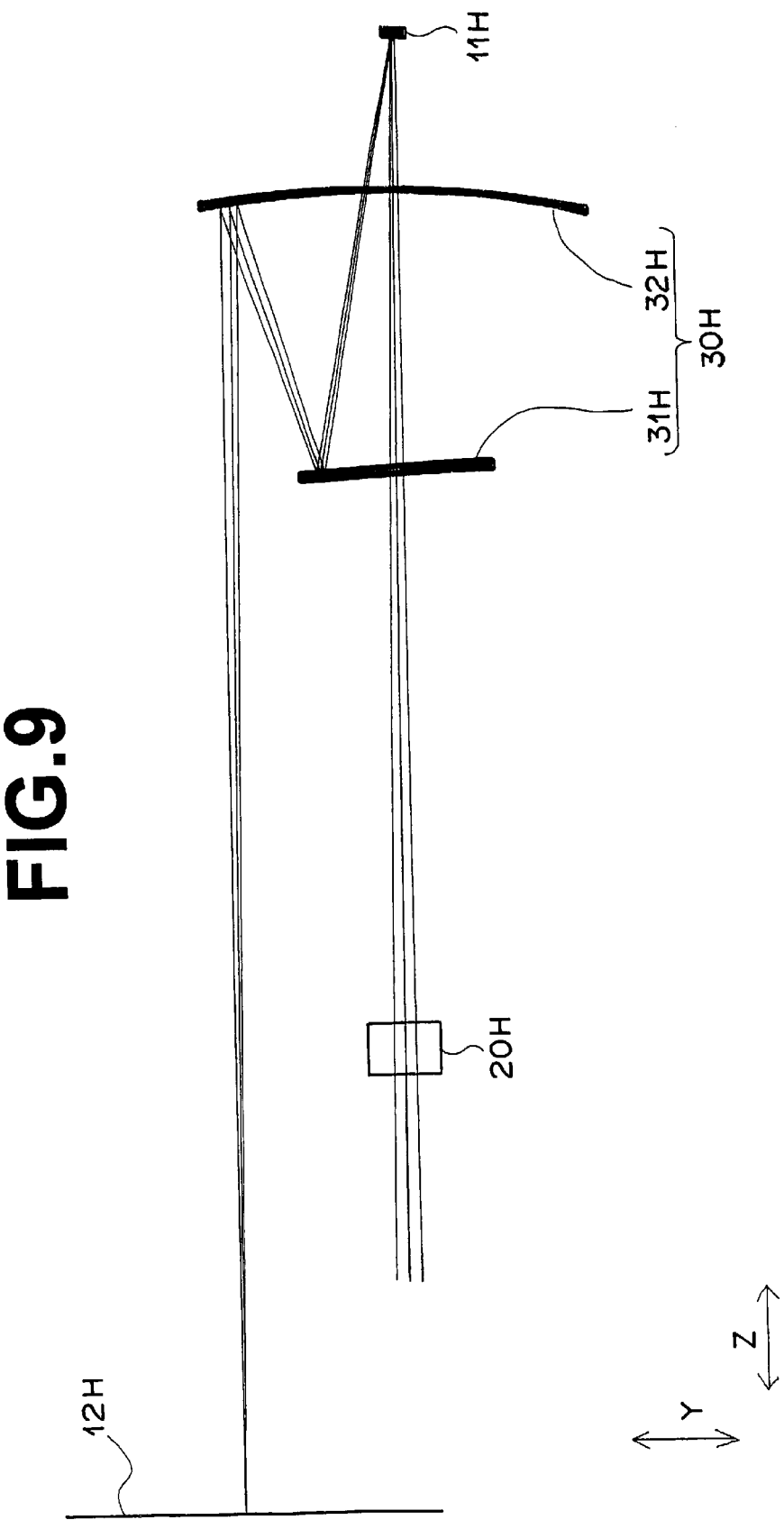
FIG. 9 is a side view briefly showing a second example of designing (example H) of the light scanning system shown in FIG. 1.
Figure 10:
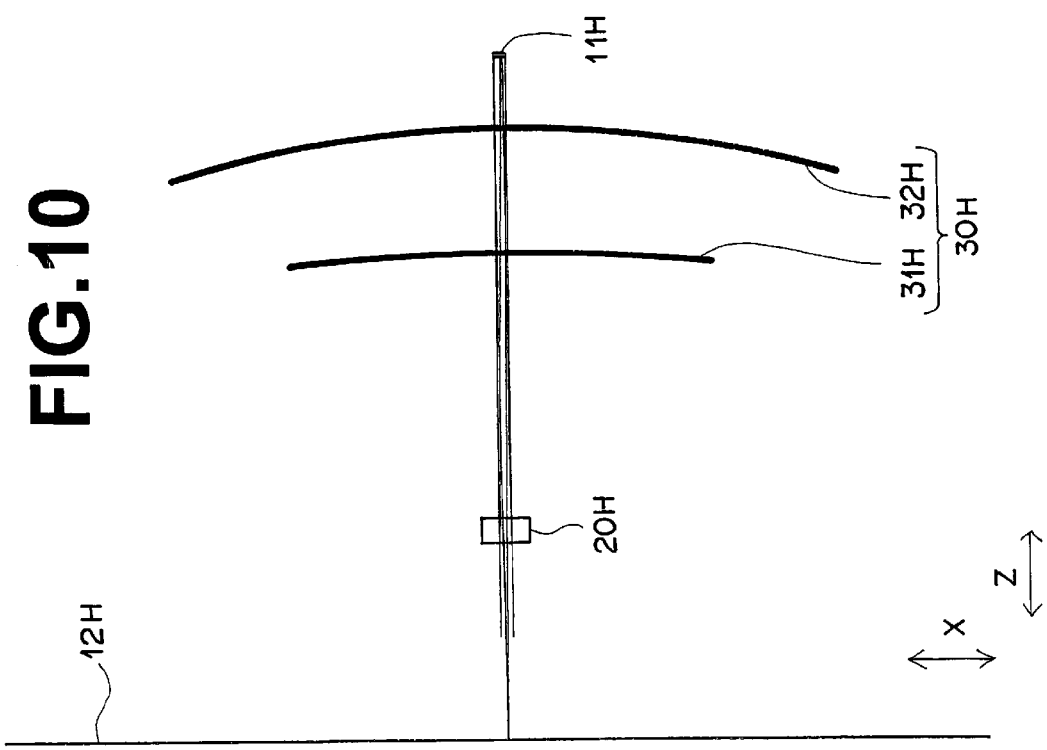
FIG. 10 is a plan view briefly showing the second example of designing of the light scanning system shown in FIG. 1.

FIG. 9 is a side view of the example of designing G and FIG. 10 is a plan view of the same. The optical axis of the line image imaging optical system 20H is moved to the Y-Z plane so that the optical path length from the line image imaging optical system 20H to the rotary polygonal mirror 11H does not change.

The specification of the respective optical elements ((1) to (5)), design performance (6) and calculation of the values of P and Q (7) in the example of designing H will be described, hereinbelow.

Fθ characteristics of the light spots imaged on the scan surface at a plurality of rotating angles of the rotary polygonal mirror (i.e., 0°, ±21°, ±29.4° and ±42°), the positions yp of the light spots in the Y-direction at the respective rotating angles of the rotary polygonal mirror, fluctuation in bows of the scanning line ypos, the amount of field curvature xfo in converging the light bundle in the X-direction at the respective rotating angles of the rotary polygonal mirror, fluctuation in amounts of field curvature xfo in converging the light bundle in the X-direction (peak-to-peak value of the amounts of field curvature xfo), the amount of field curvature yfo in converging the light bundle in the Y-direction at the respective rotating angles of the rotary polygonal mirror, fluctuation in amounts of field curvature yfo in converging the light bundle in the Y-direction (peak-to-peak value of the amounts of field curvature yfo) are shown in the following table 4.

TABLE 4

| angle | light spot position | fθ | yp | xfo | yfo |
|---|---|---|---|---|---|
| 42 | 176 | 0 | 1.368 | −0.032 | 0.481 |
| 29.4 | 123.2 | 0 | 1.373 | 0.285 | 0.148 |
| 21 | 88 | 0 | 1.361 | −0.295 | −0.247 |
| 0 | 0 | 0 | 1.368 | 0.071 | 0.099 |
| −21 | −88 | 0 | 1.361 | −0.295 | −0.247 |
| −29.4 | −123.2 | 0 | 1.373 | 0.286 | 0.148 |
| −42 | −176 | 0 | 1.368 | −0.032 | 0.481 |
| p-p | | ft = 0 | ypos = 0.012 | Max:0.581 | Max:0.729 |

Figure 11:
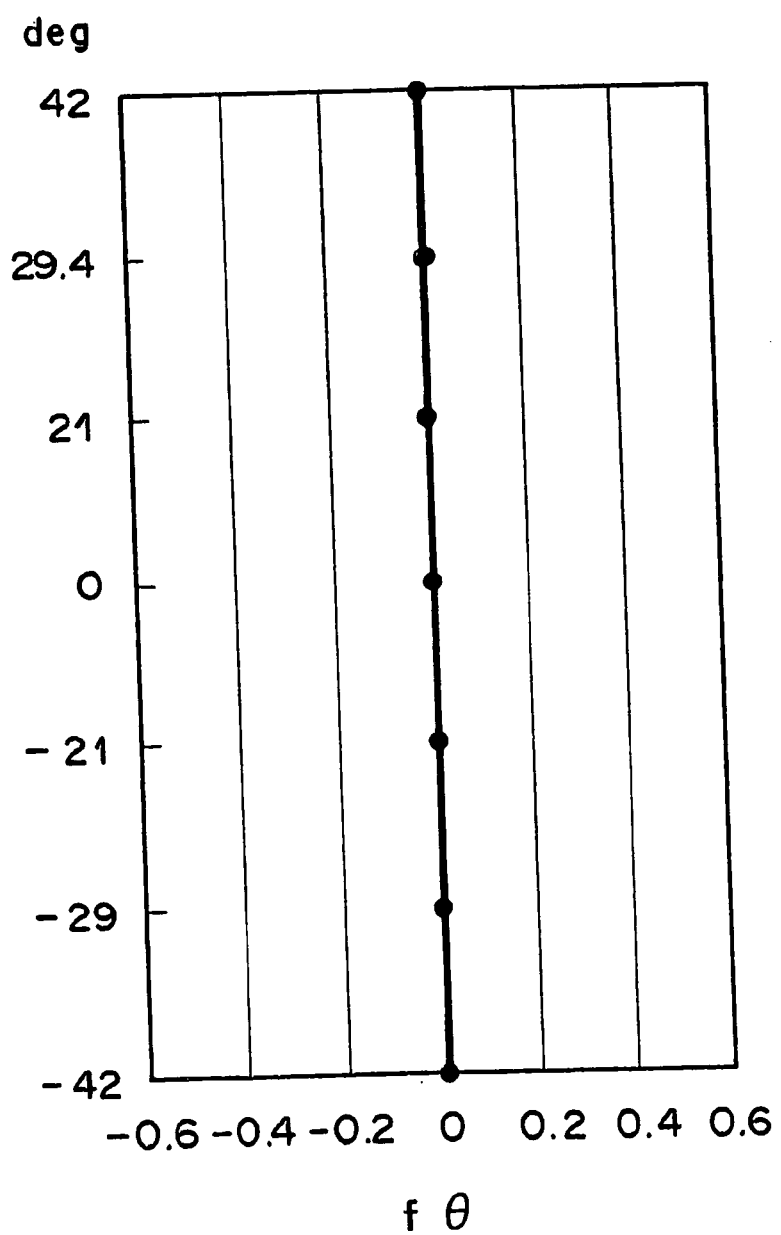
FIG. 11 is a graph showing the width of fθ error in the second example of designing.
Figure 12:
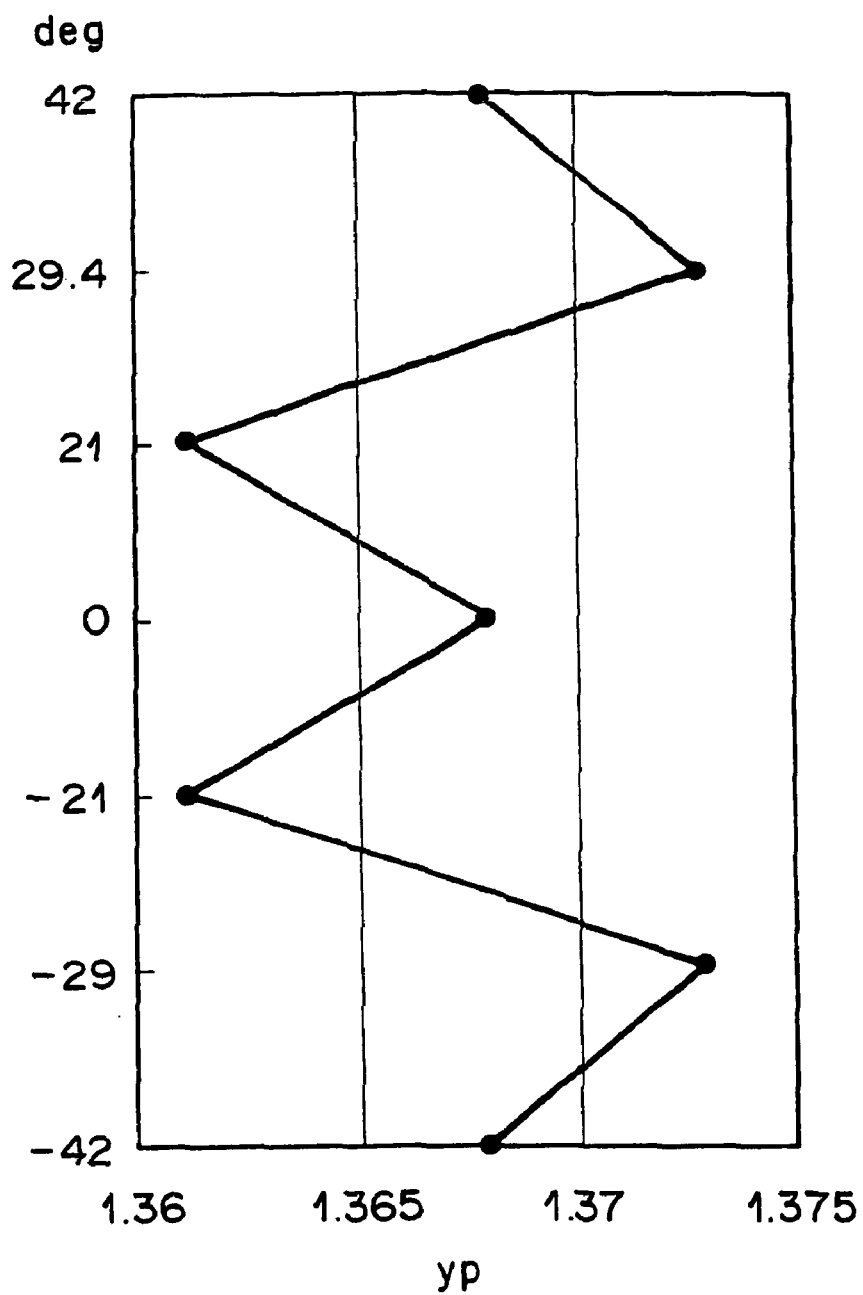
FIG. 12 is a graph showing the bow of the light spot in the Y-direction in the second example of designing.
Figure 13:
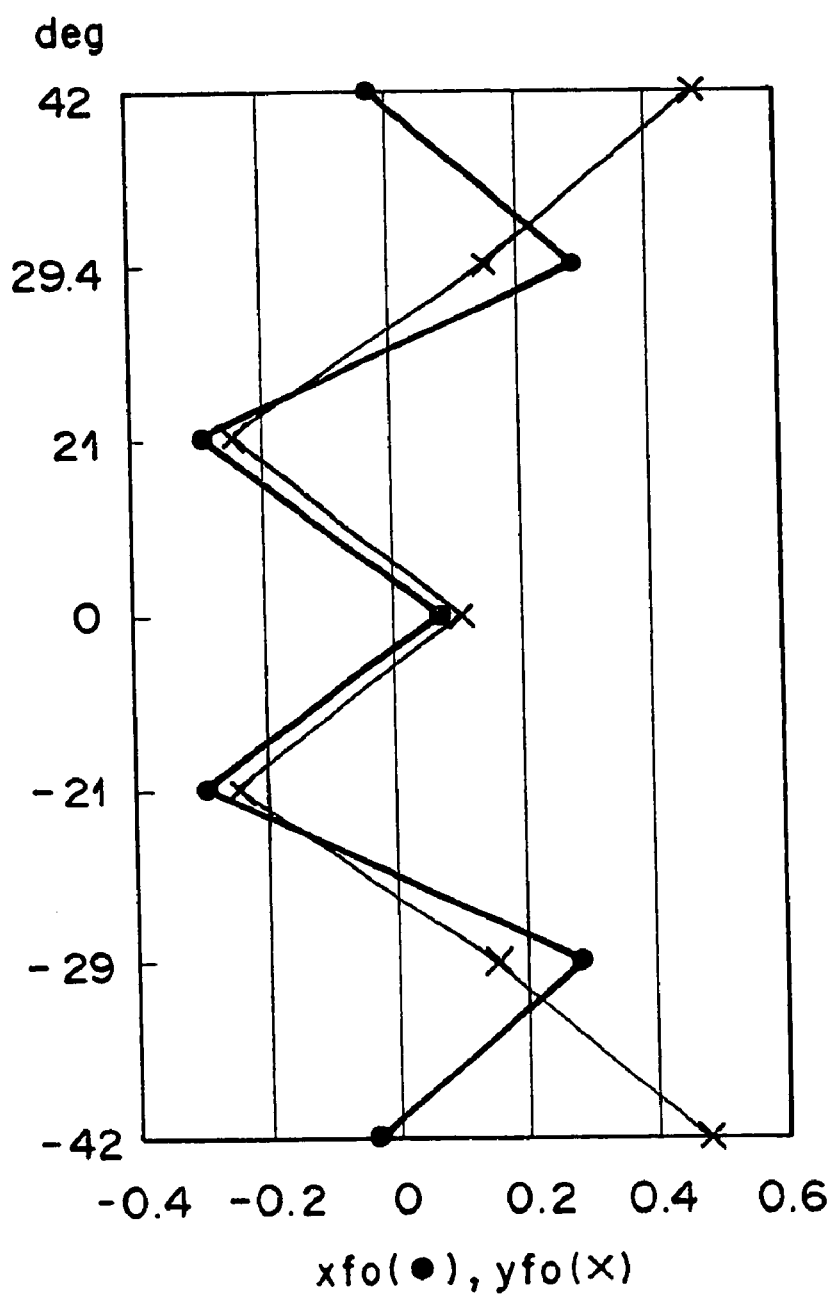
FIG. 13 is a graph showing the field curvature in the second example of designing.

FIGS. 11, 12 and 13 respectively show fθ characteristics of the light spots imaged on the scan surface at the aforesaid rotating angles of the rotary polygonal mirror, the positions yp of the light spots in the Y-direction at the aforesaid rotating angles of the rotary polygonal mirror, and the amount of field curvature xfo in converging the light bundle in the X-direction and the amount of field curvature yfo in converging the light bundle in the Y-direction at the respective rotating angles of the rotary polygonal mirror.

(1) The Specification of the Line Image Imaging Optical System 20H
lens system: single lens
thickness: 8.625837 mm
glass: BSC7 HOYA
radius of curvature of the first face in the Y-Z section, rdy1: 88.73457 mm
radius of curvature of the first face in a cross-section which includes the optical axis and is normal to the Y-Z section, rdx1: 388.42515 mm
radius of curvature of the second face in the Y-Z section, rdy2=radius of curvature of the second face in a cross-section which includes the optical axis and is normal to the Y-Z section, rdx2=∞ (plane)
(2) The Specification of the First Aspheric Mirror 31H
focal length in the Y-Z section, efym1=focal length in a cross-section which includes the optical axis and is normal to the Y-Z section, efxm1=−376.227 mm
rdy=752.45455 mm
aspheric coefficients
K=−100.775715
A=0.578683E-7
B=−0.616175E-11
C=0.255522E-15
D=0.197146E-20
inclination to the Z-direction of the aspheric axis in the YZ section, αm1: 3.2070°
(3) The Specification of the Second Aspheric Mirror 32H
focal length in the Y-Z section, efym2=69.235 mm
focal length in a cross-section which includes the optical axis and is normal to the Y-Z section, efxm2=185.028 mm
rdy=−138.47086 mm
rdx=−370.05529 mm
aspheric parameters
KY=−2.182209
KX=−0.851945
AR=−0.727070E-08
BR=0.417889E-12
CR=−0.494209E-14
DR=0.120920E-17
AP=−0.967812E-01
BP=0.170026E+00
CP=0.912777E+00
DP=0.943001E+00
inclination to the Z-direction of the aspheric axis in the YZ section, αm2: −1.658°
(4) The Specification of the Scanning/imaging Optical System 30H (the Combined Specification of the First and Second Aspheric Mirrors 31H and 32H)
focal length in the Y-Z section, efy=74.261 mm
focal length in a cross-section which includes the optical axis and is normal to the Y-Z section, efx=296.257 mm
distance between the reflecting surface in a plane which includes the optical axis and is normal to the Y-Z section and the front principal point of the scanning/imaging optical system, H: 70.090 mm
(5) Other Data
the distance from the rear end of the line image imaging optical system 20H to the deflecting face of the rotary polygonal mirror 11H: 166.555 mm distance from the deflecting face of the rotary polygonal mirror 11H to the first aspheric mirror 31H, $d_{pmm1}$: 70.000 mm distance from the first aspheric mirror 31H to the second aspheric mirror 32H, $d_{m1m2}$: 43.775 mm distance from the second aspheric mirror 32H to the scan surface 12H: 219.011 mm inclination to the Y-direction of the axis of rotation of the rotary polygonal mirror 11H in the YZ section: 5.0° length of the first aspheric mirror 31H in the X-direction (corresponding to the whole scanning angle): 140 mm length of the second aspheric mirror 32H in the X-direction (corresponding to the whole scanning angle): 220 mm (6) Design Performance fluctuation in bows of scanning lines (p—p): 0.012 mm fluctuation in fθ errors (%): 0.000(%)

fluctuation in amounts of field curvature in converging the light bundle in the Y-direction (p—p): 0.581 mm fluctuation in amounts of field curvature in converging the light bundle in the X-direction (p—p): 0.729 mm (7) Calculation of the Values of P and Q $$P = (|\alpha m1 \times efym1| - |\alpha m2 \times efym2|)/efy$$
$$= (|3.207 \times (-376.277)| - |(-1.685) \times 69.235|)/74.261$$
$$= 14.702 < 35$$

$$Q = d0/efx$$
$$= (d_{pmm1} + H)/efx$$
$$= (70.000 + 70.090)/296.257$$
$$= 0.473 > 0.4$$

<Third Example of Designing (Example of Designing A)>

Figure 14:
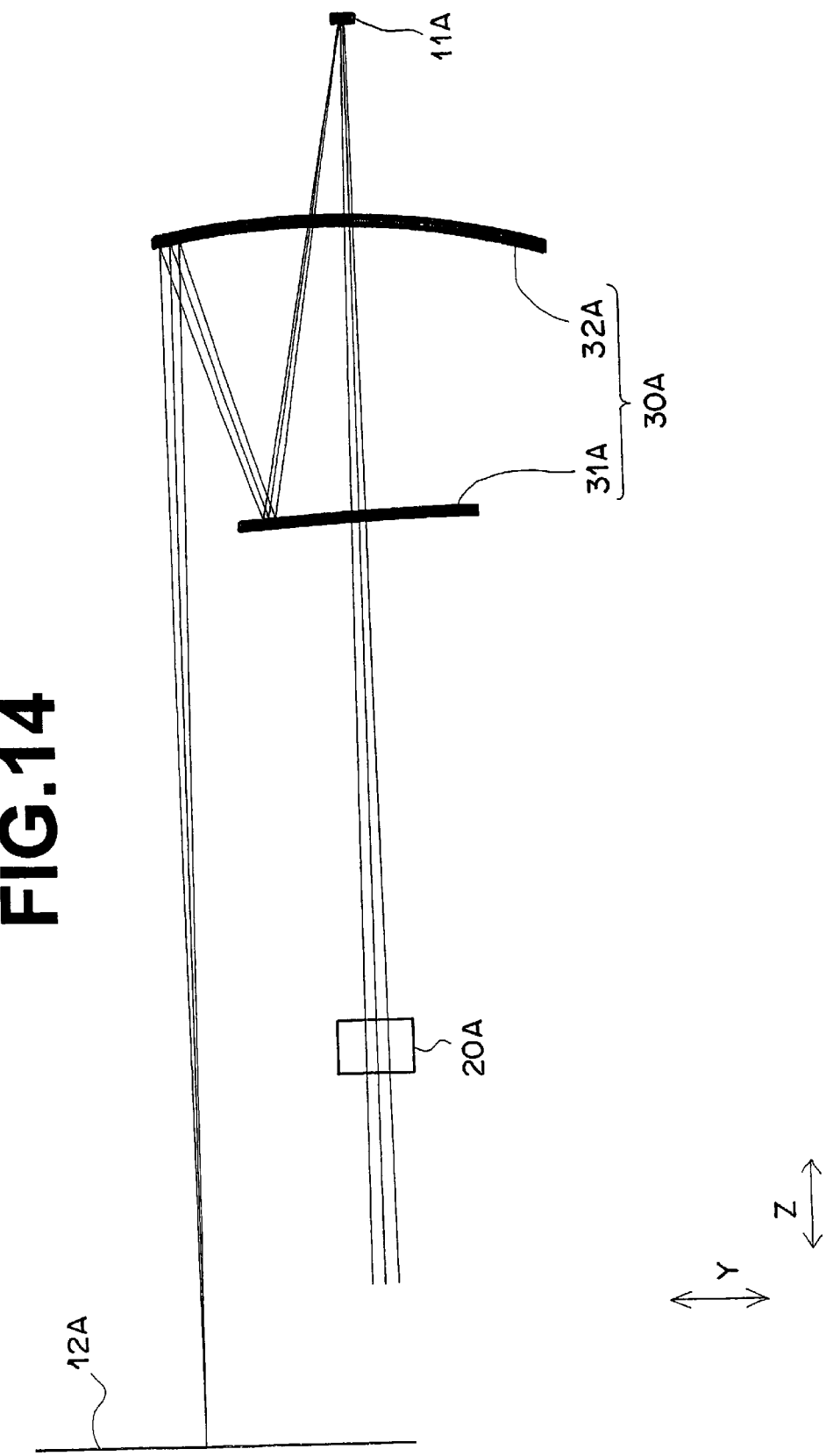
FIG. 14 is a side view briefly showing a third example of designing (example A) of the light scanning system shown in FIG. 1.
Figure 15:
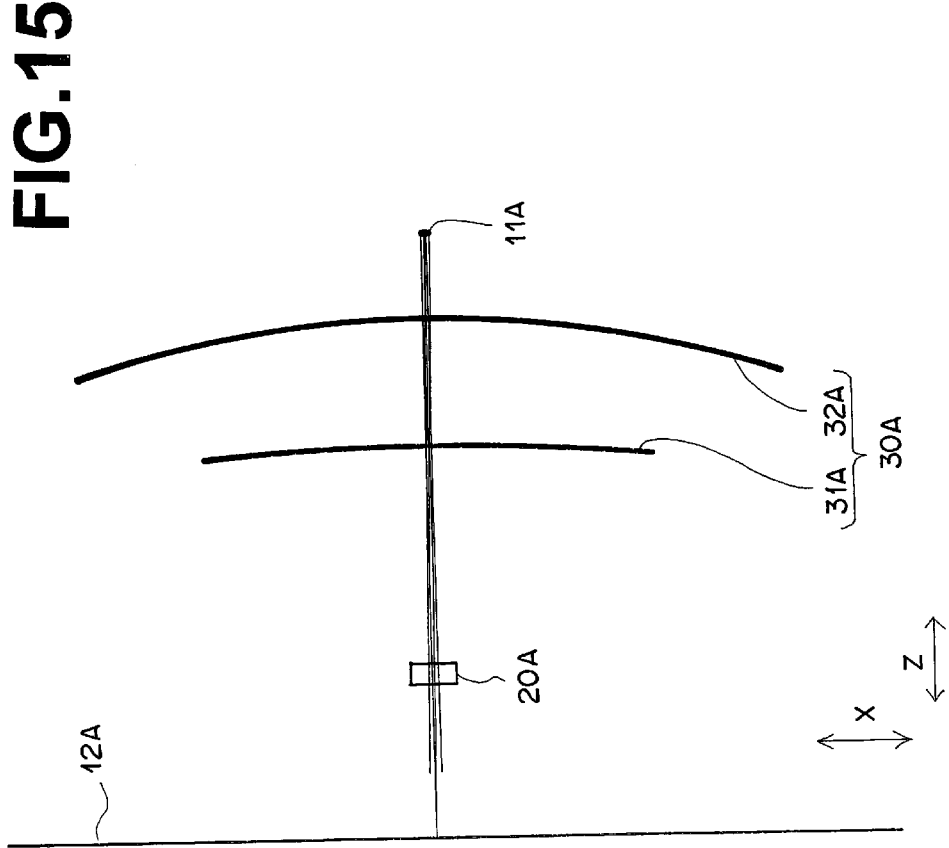
FIG. 15 is a plan view briefly showing the third example of designing of the light scanning system shown in FIG. 1.

FIG. 14 is a side view of the example of designing A and FIG. 15 is a plan view of the same. The optical axis of the line image imaging optical system 20A is moved to the Y-Z plane so that the optical path length from the line image imaging optical system 20A to the rotary polygonal mirror 11A does not change.

The specification of the respective optical elements ((1) to (5)), design performance (6) and calculation of the values of P and Q (7) in the example of designing A will be described, hereinbelow.

Fθ characteristics of the light spots imaged on the scan surface at a plurality of rotating angles of the rotary polygonal mirror (i.e., 0°, ±21°, ±29.4° and ±42°), the positions yp of the light spots in the Y-direction at the respective rotating angles of the rotary polygonal mirror, fluctuation in bows of the scanning line ypos, the amount of field curvature xfo in converging the light bundle in the X-direction at the respective rotating angles of the rotary polygonal mirror, fluctuation in amounts of field curvature xfo in converging the light bundle in the X-direction (peak-to-peak value of the amounts of field curvature xfo), the amount of field curvature yfo in converging the light bundle in the Y-direction at the respective rotating angles of the rotary polygonal mirror, fluctuation in amounts of field curvature yfo in converging the light bundle in the Y-direction (peak-to-peak value of the amounts of field curvature yfo) are shown in the following table 5.

TABLE 5

| angle | light spot position | fθ | yp | xfo | yfo |
|---|---|---|---|---|---|
| 42 | 176 | 0 | 3.518 | −0.092 | 0.366 |
| 29.4 | 123.2 | 0 | 3.521 | 0.351 | 0.214 |
| 21 | 88 | 0 | 3.514 | −0.42 | −0.156 |
| 0 | 0 | 0 | 3.518 | 0.1 | 0.1 |
| −21 | −88 | 0 | 3.514 | −0.42 | −0.156 |
| −29.4 | −123.2 | 0 | 3.521 | 0.352 | 0.214 |
| −42 | −176 | 0 | 3.518 | −0.092 | 0.366 |
| p-p | | ft = 0 | ypos = 0.008 | Max:0.772 | Max:0.522 |

Figure 16:
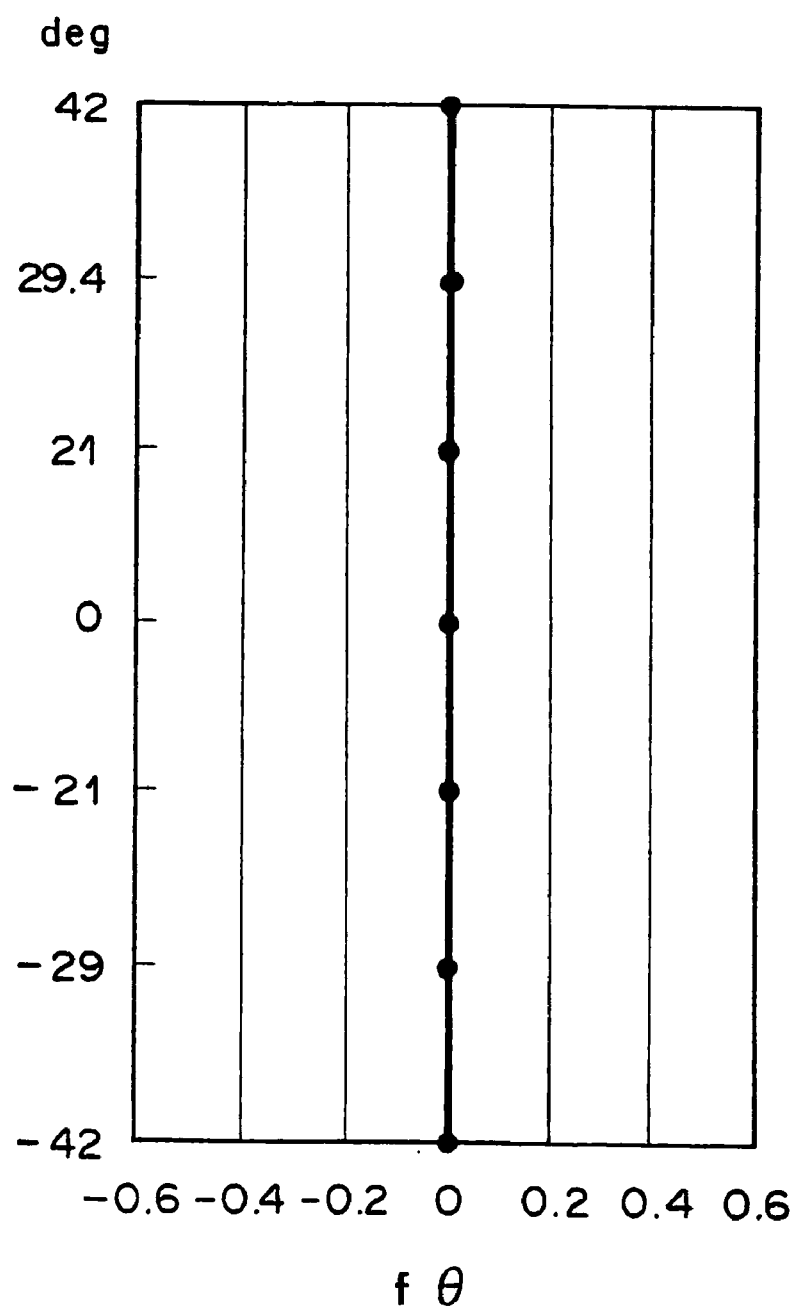
FIG. 16 is a graph showing the width of fθ error in the third example of designing.
Figure 17:
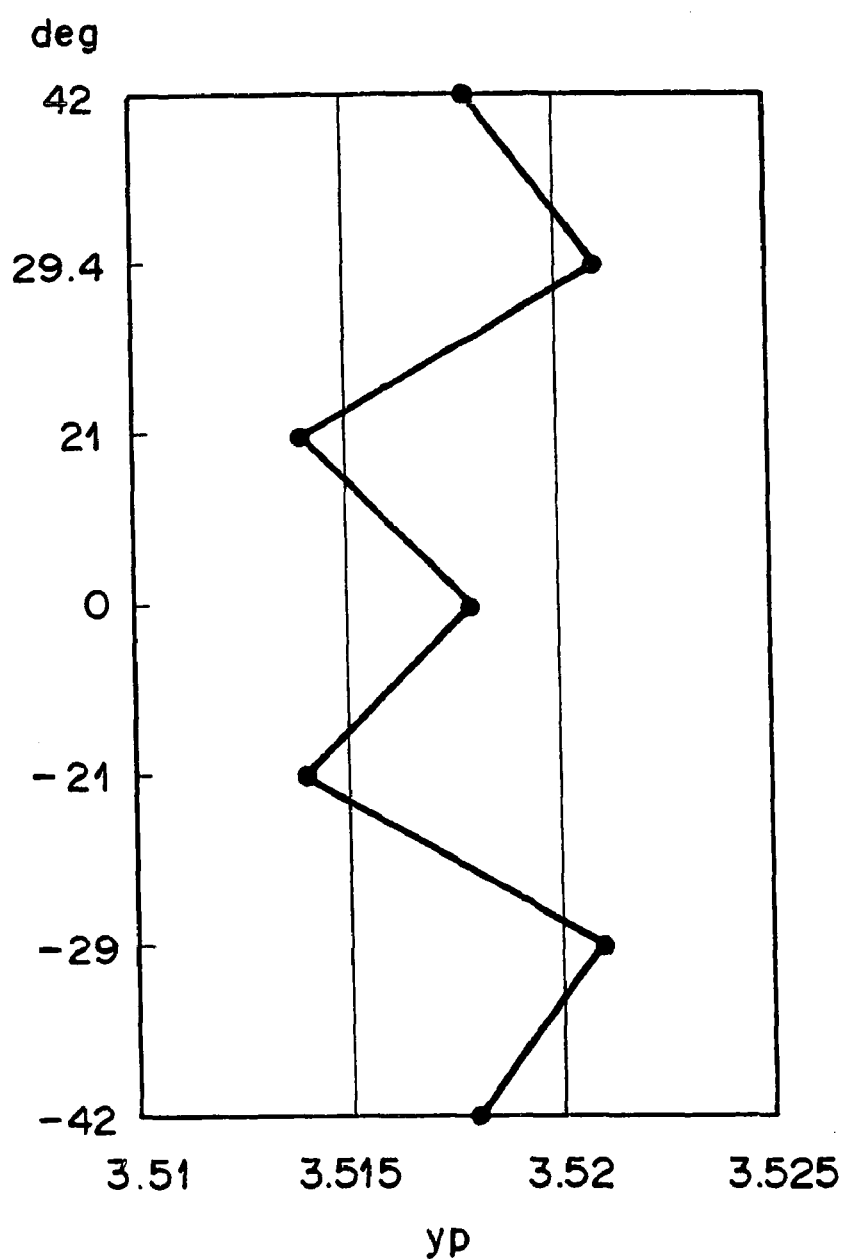
FIG. 17 is a graph showing the bow of the light spot in the Y-direction in the third example of designing.
Figure 18:
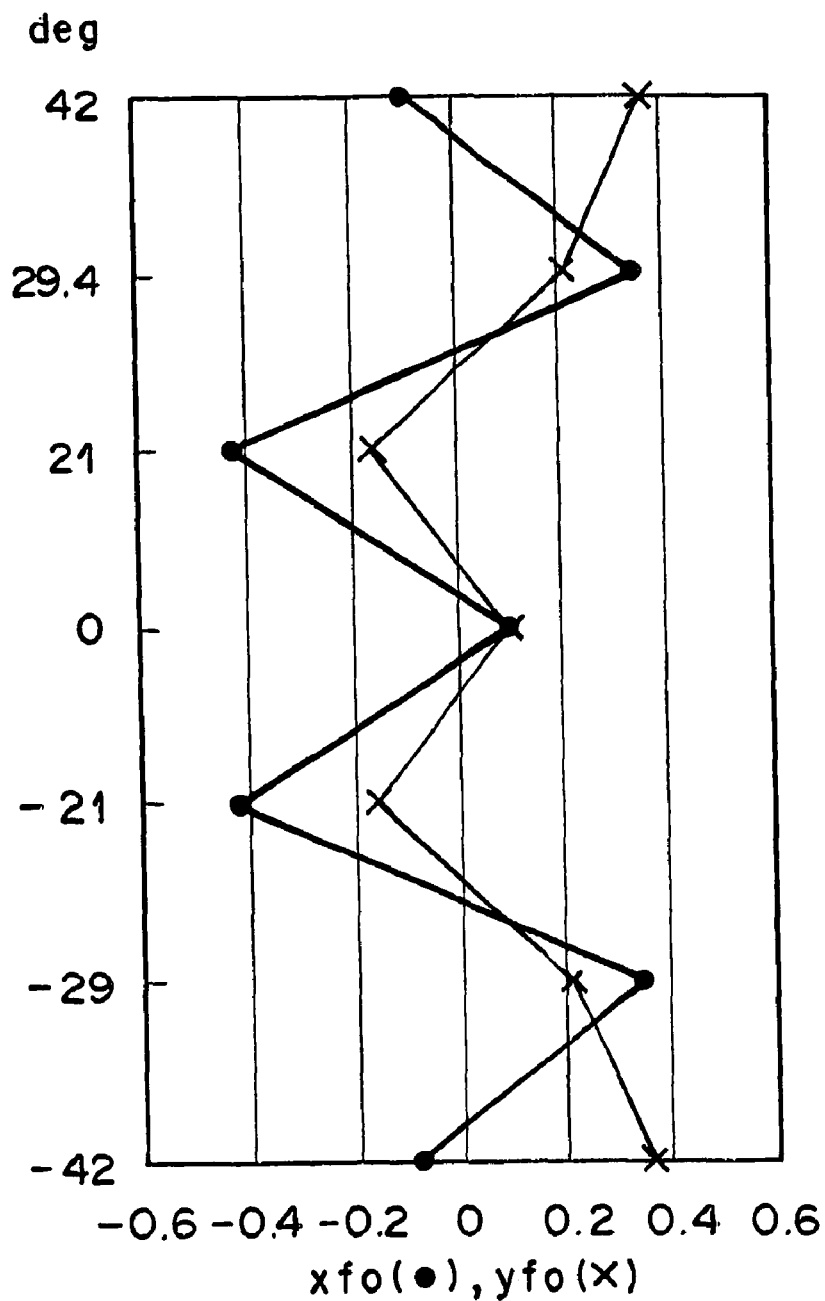
FIG. 18 is a graph showing the field curvature in the third example of designing.

FIGS. 16, 17 and 18 respectively show fθ characteristics of the light spots imaged on the scan surface at the aforesaid rotating angles of the rotary polygonal mirror, the positions yp of the light spots in the Y-direction at the aforesaid rotating angles of the rotary polygonal mirror, and the amount of field curvature xfo in converging the light bundle in the X-direction and the amount of field curvature yfo in converging the light bundle in the Y-direction at the respective rotating angles of the rotary polygonal mirror.

(1) The Specification of the Line Image Imaging Optical System 20A lens system: single lens thickness: 8.625837 mm glass: BSC7 HOYA radius of curvature of the first face in the Y-Z section, rdy1: 88.73457 mm radius of curvature of the first face in a cross-section which includes the optical axis and is normal to the Y-Z section, rdx1: 333.66044 mm radius of curvature of the second face in the Y-Z section, rdy2=radius of curvature of the second face in a cross-section which includes the optical axis and is normal to the Y-Z section, rdx2=∞ (plane)

(2) The Specification of the First Aspheric Mirror 31A focal length in the Y-Z section, efym1=focal length in a cross-section which includes the optical axis and is normal to the Y-Z section, efxm1=−396.485 mm rdy=792.96954 mm aspheric coefficients

K=−132.894650

A=0.530960E-07

B=−0.53854E-11

C=0.327988E-15

D=−0.934694E-20 inclination to the Z-direction of the aspheric axis in the YZ section, αm1: 2.805°

(3) The Specification of the Second Aspheric Mirror 32A focal length in the Y-Z section, efym2=70.291 mm focal length in a cross-section which includes the optical axis and is normal to the Y-Z section, efxm2=194.928 mm rdy=−140.58269 mm rdx=−389.85648 mm aspheric parameters

KY=−2.366281

KX=0.066032

AR=−0.746007E-08

BR=0.194695E-12

CR=−0.315989E-14

DR=0.66931E-18

AP=0.162771E-00

BP=0.925186E+01

CP=0.915259E+00

DP=0.945526E+00 inclination to the Z-direction of the aspheric axis in the YZ section, αm2: −2.611°

(4) The Specification of the Scanning/imaging Optical System 30A (The Combined Specification of the First and Second Aspheric Mirrors 31A and 32A)

focal length in the Y-Z section, efy=74.781 mm focal length in a cross-section which includes the optical axis and is normal to the Y-Z section, efx=311.578 mm distance between the reflecting surface in a plane which includes the optical axis and is normal to the Y-Z section and the front principal point of the scanning/imaging optical system, H: 74.311 mm (5) Other Data the distance from the rear end of the line image imaging optical system 20A to the deflecting face of the rotary polygonal mirror 11A: 166.555 mm distance from the deflecting face of the rotary polygonal mirror 11A to the first aspheric mirror 31A, $d_{pmm1}$: 80.000 mm distance from the first aspheric mirror 31A to the second aspheric mirror 32A, $d_{m1m2}$: 46.490 mm distance from the second aspheric mirror 32A to the scan surface 12A: 200.235 mm inclination to the Y-direction of the axis of rotation of the rotary polygonal mirror 11A in the YZ section: 5.0° length of the first aspheric mirror 31A in the X-direction (corresponding to the whole scanning angle): 160 mm length of the second aspheric mirror 32A in the X-direction (corresponding to the whole scanning angle): 250 mm (6) Design Performance fluctuation in bows of scanning lines (p-p): 0.008 mm fluctuation in fθ errors (%): 0.000(%)

fluctuation in amounts of field curvature in converging the light bundle in the Y-direction (p—p): 0.772 mm fluctuation in amounts of field curvature in converging the light bundle in the X-direction (p—p): 0.522 mm (7) Calculation of the Values of P and Q $$P = (|\alpha m1 \times efym1| - |\alpha m2 \times efym2|)/efy$$
$$= (|2.805 \times (-396.485)| - |(-2.611) \times 70.291|)/74.781$$
$$= 12.418 < 35$$

$$Q = d0/efx$$
$$= (d_{pmm1} + H)/efx$$
$$= (80.000 + 74.311)/311.578$$
$$= 0.495 > 0.4$$

Though, in the embodiment described above, the line image imaging optical system has a positive power in the direction in which the line image L extends, the fθ error can be suppressed even if the line image imaging optical system has no power or a negative power in the direction in which the line image L extends.

What is claimed is:

1. A light scanning system for causing a light spot to scan a scan surface at a constant speed comprising a light source, a deflecting means which deflects a light bundle radiated from the light source, a line image imaging optical system which is disposed between the light source and the deflecting means and images a light bundle radiated from the light source on a deflecting surface of the deflecting means as a line image extending in a direction in which the light bundle is deflected, and a scanning/imaging optical system which is disposed between the deflecting means and the scan surface and images the light bundle deflected by the deflecting means on the scan surface as a light spot, wherein the improvement comprises that the scanning/imaging optical system comprises a first aspheric mirror which is symmetric with respect to an axis of rotation and is disposed on the light inlet side of the scanning/imaging optical system and a second aspheric mirror which is anamorphic and is disposed on the light outlet side of the scanning/imaging optical system, the first aspheric mirror having a negative power in the direction in which a light bundle impinging upon the first aspheric mirror is deflected and the second aspheric mirror having a positive power in the direction in which a light bundle impinging upon the second aspheric mirror is deflected.

2. A light scanning system as defined in claim 1 in which the line image imaging optical system has a positive power in the direction in which the line image of the light bundle extends.

3. A light scanning system as defined in claim 1 in which the scanning/imaging optical system satisfies the following formulae (1) and (2), $$(|\alpha m1 \times efym1| - |\alpha m2 \times efym2|)/efy < 35 \quad (1)$$

$$d0/efx > 0.4 \quad (2)$$

wherein αm1 represents the inclination to Z-direction of the optical axis of the first aspheric mirror in YZ plane, efym1 represents the focal length of the first aspheric mirror, αm2 represents the inclination to the Z-direction of the optical axis of the second aspheric mirror in Y-Z plane, efym2 represents the focal length of the second aspheric mirror on a cross-section along the Y-Z plane, efy represents the focal length of the scanning/imaging optical system on a cross-section along the Y-Z plane, efx represents the focal length of the scanning/imaging optical system on a plane normal to the Y-Z plane, and d0 represents the distance between the deflecting surface of the deflecting means on which the line image is imaged and the front principal point of the scanning/imaging optical system on a plane normal to the Y-Z plane, assuming that a direction in which the light spot is caused to scan the scan surface is the X-direction, a direction which is normal to the X-direction on the scan surface is Y-direction and a direction normal to both the X-direction and the Y-direction (i.e., a direction normal to the scan surface) is the Z-direction.

* * * * *